(12) United States Patent
Selig et al.

(10) Patent No.: US 6,950,031 B2
(45) Date of Patent: Sep. 27, 2005

(54) DEVICE AND METHOD FOR DETECTING AND PREPROCESSING WEIGHTS ACTING ON A VEHICLE SEAT

(75) Inventors: Klaus Peter Selig, Balingen-Weilstetten (DE); Klaus Wurster, Pliezhausen (DE)

(73) Assignee: Bizerba GmbH & Co. KG, Balingen (DE)

( * ) Notice: Subject to any disclaimer, the term of this patent is extended or adjusted under 35 U.S.C. 154(b) by 0 days.

(21) Appl. No.: 10/699,556

(22) Filed: Oct. 31, 2003

(65) Prior Publication Data

US 2004/0135355 A1 Jul. 15, 2004

Related U.S. Application Data

(63) Continuation of application No. PCT/EP02/04768, filed on Apr. 30, 2002.

(30) Foreign Application Priority Data

May 1, 2001 (DE) .......................................... 101 20 978

(51) Int. Cl.[7] .............................................. G08B 21/00
(52) U.S. Cl. ....................... 340/666; 340/665; 340/667; 180/271; 180/273; 280/734; 280/735
(58) Field of Search ................................ 340/665, 666, 340/667; 280/734, 735; 180/271, 273

(56) References Cited

U.S. PATENT DOCUMENTS

| | | | |
|---|---|---|---|
| 5,074,583 A | 12/1991 | Fujita et al. | |
| 5,474,327 A | 12/1995 | Schousek | |
| 5,573,269 A | 11/1996 | Gentry et al. | |
| 5,739,757 A | 4/1998 | Gioutsos | |
| 5,905,210 A | 5/1999 | O'Boyle et al. | |
| 6,070,113 A | * 5/2000 | White et al. ................... | 701/45 |
| 6,070,115 A | 5/2000 | Oestreicher et al. | |
| 6,199,902 B1 | 3/2001 | Cooper et al. | |
| 6,533,317 B2 | 3/2003 | Kath | |
| 6,561,542 B2 | * 5/2003 | Chitalia et al. ............. | 280/734 |
| 6,725,165 B1 | * 4/2004 | Knox et al. ................... | 702/42 |
| 2003/0150283 A1 | * 8/2003 | Stanley et al. ......... | 73/862.391 |

FOREIGN PATENT DOCUMENTS

| | | |
|---|---|---|
| DE | 38 09 074 A1 | 10/1989 |
| DE | 44 42 841 A1 | 6/1995 |

(Continued)

*Primary Examiner*—Julie Bichngoc Lieu
(74) *Attorney, Agent, or Firm*—Leydig, Voit & Mayer, Ltd.

(57) ABSTRACT

In order to form a device for detecting and preprocessing weights acting on a vehicle seat in such a way that it can be used in particular in conditions which are very difficult in terms of measuring technology, and in particular under the other special ambient conditions within a vehicle, and the weighing signal of which is substantially uninfluenced by this and can consequently provide a reliable parameter for airbag activation, it is proposed that this device comprises at least three load cells, which are disposed on load-carrying parts of the vehicle seat at corner points of an imaginary polygonal area and in each case generate a weighing signal corresponding to the weight, and an electronic evaluation circuit, which receives and preprocesses the weighing signals of the load cells and generates an output signal based on the weighing signals, the evaluation circuit comprising an evaluation function with which a localization of the center of gravity of the weight acting on the vehicle seat can be carried out from the individual weighing signals of the at least three load cells, and the evaluation circuit comprising a correction function, with which force bypasses can be taken into account in the forming of the output signal.

28 Claims, 4 Drawing Sheets

FOREIGN PATENT DOCUMENTS

| | | |
|---|---|---|
| DE | 44 20 691 C1 | 1/1996 |
| DE | 197 19 623 A1 | 11/1997 |
| DE | 197 52 356 A1 | 5/1999 |
| DE | 198 20 212 A1 | 11/1999 |
| JP | 09107847 | 11/1998 |
| JP | 10297334 A | 11/1998 |
| JP | 10-297334 * | 11/1998 |
| WO | WO 00/50255 | 8/2000 |
| WO | WO 00/53458 | 9/2000 |
| WO | WO 01/12473 A1 | 2/2001 |

* cited by examiner

FIG. 6

DEVICE AND METHOD FOR DETECTING AND PREPROCESSING WEIGHTS ACTING ON A VEHICLE SEAT

The present disclosure relates to the subject matter disclosed in German application No. 101 20 978.9 of May 1, 2001, which is incorporated herein by reference in its entirety and for all purposes.

This application is a continuation of PCT/EP02/04768, which claims priority to German application No. 101 20 978.9.

BACKGROUND OF THE INVENTION

The invention relates to a device for detecting and preprocessing weights acting on a vehicle seat.

In the course of introducing airbags as standard for the passenger seat in motor vehicles there arises the problem of detecting the occupancy of the seat, so that the passenger airbag is released for firing only in those cases in which the seat is occupied. Firing of the passenger airbag when the passenger seat is not occupied not only has the consequence that an additional increase in pressure in the vehicle is unnecessarily caused in the event of an accident by the firing of the passenger airbag, but also that, due to the integration of the passenger airbag into the dashboard, considerable repair measures are necessary in the passenger compartment of the vehicle following firing of the airbag.

Various problems which have been observed when airbags are fired with small children or youngsters traveling on the passenger seat have ultimately led to the requirement that, in the event of an accident, an airbag must be operated in a way which is adapted to the person sitting on the vehicle seat.

This gives rise to the problem of determining the necessary data for firing the airbag in a way appropriate for requirements.

One possible reference point is to detect the weight of the respective vehicle occupant, the size and physical robustness of the occupant then being concluded on the basis of a weight determination.

U.S. Pat. No. 5,739,757 proposes using sensors incorporated in the seat cushion of a vehicle seat to determine the weight of the vehicle occupant and to fire the airbag in accident situations only in the case in which a lower weight limit is exceeded. In addition, the position of the occupant on the seat is determined, so that the airbag can be switched off if the occupant is too close to the airbag for safe firing. Recommended in this case as sensors are ferromagnetic elements which change their magnetic permeability under the horizontal tensile loading occurring here.

It is a disadvantage of this solution that changes in the spring constant of the seat suspension (aging, use) lead to an additional zero drift of the weighing signal of the sensor elements. In addition, considerable measuring errors occur when the vehicle accelerates or decelerates, and have to be corrected in a complex way. An adverse effect of these measuring errors is that they correspond to interference signals with a long period/low frequency. As a result, a more time-consuming correction has to be performed, making the measuring system intrinsically slow to respond. In addition, when the vehicle is inclined, a great measuring error is obtained, and can only be corrected with considerable effort.

DE 38 09 074 A1 proposes disposing weight sensors in the region of the seat rail of the vehicle seat to determine the sitting position or position of the center of gravity of the vehicle occupant and to decide according to the sitting position whether the airbag is partly or fully fired and deployed in an accident situation. Recommended quite generally here are inductive sensors, with no recommendation being given for the actual construction of the sensors.

A particular disadvantage of this solution is that the seat rails have to be disposed higher above the floor of the vehicle than would otherwise be necessary without the sensors. This, however, impairs the headroom for the occupants of the vehicle.

In weighing technology there are many different known load cells which have their weighing signal preprocessed and displayed.

The load cells comprise a force transducer and a sensor element, which supplies a measuring signal when the force transducer is subjected to loading.

Known force transducers are in many cases based on the deformation being detected as a surface expansion. Typical of these are strain-gage transducers, in which the surface expansion occurring when there is deformation is converted into a change in electrical resistance.

These strain-gage transducers achieve very high degrees of accuracy, but can be protected against ambient influences only with great effort, since the strain-sensitive sensor elements are located directly on the elastically deforming part and covering of the sensors has the concomitant effect of force bypasses, which have direct adverse effects on the properties of the transducer.

In the case of capacitively operating load cells, elastic deformation of the deformable part causes a change in the spacing between two capacitor plates, and consequently in the capacitance of the latter, whereas in the case of the inductively operating force transducers described at the beginning the spatial distribution of an alternating magnetic field is changed by the deformation, which leads to a change in the inductance of a pickup coil of the sensor element.

DE 44 20 691 C1 discloses inductively operating load cells which are designed specifically for applications in weighing technology. These prove to be unsuitable under extreme ambient conditions, in particular such as occur for example in a motor vehicle, since they are too susceptible to interference.

In terms of measuring technology, the vehicle interior is extremely problematical, since not only do interference signals of the engine ignition (electromagnetic fields with high field strengths) occur to a considerable extent and have to be eliminated in signaling terms, but it is also necessary with respect to the functional capability of sensors that are to be used to take into account extreme vibrations, temperature conditions in a range from, for example, −40° C. to +85° C., rapid temperature changes and also atmospheric humidity ranging right up to the dew point.

Furthermore, account must be taken of the fact that not only the weights of the occupants act on the seat but also, when the vehicle accelerates and, in particular, decelerates suddenly, forces which are many times greater, not to mention the forces occurring in an accident situation, which likewise must not lead to malfunctioning of the sensors.

As well as this there are the various adjusting possibilities for a vehicle seat which are provided in modern motor vehicles and may only influence the measuring result within defined limits.

SUMMARY OF THE INVENTION

It is therefore an object of the invention to form a device of the type described at the beginning in such a way that it can be used in particular in conditions which are very difficult in terms of measuring technology, and in particular under the other special ambient conditions within a vehicle, and the weighing signal of which is substantially uninfluenced by this and can provide a reliable parameter for airbag activation over long periods of time.

This object is achieved in the case of the device stated at the beginning according to the invention by said device comprising: at least three load cells, which are disposed on load-carrying parts of the vehicle seat at corner points of an imaginary polygonal area and in each case generate a weighing signal corresponding to the weight, and an electronic evaluation circuit, which receives and preprocesses the weighing signals of the load cells and generates an output signal based on the weighing signals, the evaluation circuit comprising an evaluation function with which a localization of the center of gravity of the weight acting on the vehicle seat can be carried out from the individual weighing signals of the at least three load cells, and the evaluation circuit comprising a correction function, with which force bypasses can be taken into account in the forming of the output signal, the evaluation circuit comprising a function for automatic zero-drift correction of the weighing signal, and the function for the automatic drift correction comprising a discriminator for differentiating the weighing-signal drift from low loads of a limited time.

Owing to acceleration, deceleration, shocks caused by unevennesses of the road or vibrations, the weights detected by the individual load cells in the vehicle are subject to constant changes. The evaluation circuit in this case assumes the task of assessing weighing signals supplied by the load cells on the basis of predetermined criteria. Included in the assessment are long-term mean values, minima and maxima and also the variation of the changes over time.

The determination or localization of the center of gravity provides important reference points for the sitting position of the occupant and a possible situation putting the latter at risk in the event of firing of the airbag.

The result of the center-of-gravity determination is used by the correction function of the evaluation circuit to take into account in the forming of the output signal the influence of force bypasses caused by legs of the occupant placed on the vehicle floor and/or arms of the occupant resting on the steering wheel or on armrests.

Placing the legs on the vehicle floor or resting the arms on the steering wheel or armrests has the effect of changing both the total weight detected by the load cells and the weight distribution on account of the shifting of the center of gravity. Consequently, the shifting of the center of gravity can be demonstrated by the proportional forces which act on each of the load cells.

For example, the further the center of gravity is shifted forward in the direction of the seat edge, the greater the proportion of the weight that can no longer be detected by the load cells due to the legs being placed on the vehicle floor. If the relationship between the position of the center of gravity, the seat geometry and the weight distribution over the individual load cells is determined, an approximating correction of such force bypasses can be performed on the basis of such data.

The inductively operating load cells used with preference for the purposes of the present invention can be constructed in such a way that they are very insusceptible to interference and in particular also very robust, which is of special significance in the case of installation in a seat of a motor vehicle, since great forces can act on the seat even in normal driving operation, during acceleration and deceleration. In the event of an accident, the forces acting on the load cell are many times greater.

Since the device is installed in a vehicle seat and must be kept operational over a period of years, the evaluation circuit must be provided with an automatically functioning zero-drift correction, so that weighing signals uninfluenced by the latter can still be obtained even after years.

Of significance in this connection is that the device has an evaluation circuit with a discriminator, which serves for differentiating between weighing-signal drift and low loads of a limited time, such as for example the placing of briefcases etc. on the vehicle seat.

A sensor element operating on the eddy current principle is used with preference. Also preferred are those sensor elements in which the weighing signals occur analogously to frequency, since in this case a particularly great and interference-immune signal is obtained. These sensor elements have the further advantage that the weighing signals can be evaluated and further processed in a simple manner.

The sensor elements of the load cells are preferably disposed in a recess in the measuring portion of the force transducer, whereby protection against mechanical effects on the sensor element is obtained. Since the force transducer is also generally produced from a metallic material, for example steel or aluminum, shielding against electromagnetic interference fields is also provided as a result.

The encapsulation allows influences of temperature and atmospheric humidity to be suppressed or even eliminated entirely.

The recess is preferably disposed in a part of the force transducer which is not deformed. This allows simple cable routing of the signal cables of the load cell and reduces the extent to which the weighing signal is influenced by the latter. The signaling face is then disposed on the elastically deforming part in the region of the measuring portion.

Various solutions for the encapsulation of the sensor element are available.

In the case of a preferred variant, the sensor element disposed in the recess is cast with a curable material.

In the case of another preferred variant, the sensor element is separately encapsulated in a separate housing and is fitted and fixed in the recess together with the housing.

For simple and reliable mounting, even in the case of possibly necessary exchange, the recess is provided with a stop, which allows exact positioning of the sensor element with respect to the distance from the signaling face.

A solution which is simple in production engineering terms is provided by the recess being formed as a continuous bore, the housing of the sensor element having a stop for the exact positioning within the bore.

The stop may be, for example, a collar protruding from the housing of the sensor element.

The housing of the sensor element is preferably formed in a substantially cylindrical manner and provided on its cylinder wall with an external thread, the bore of the recess being provided with a complementary internal thread.

The construction of the sensor element itself has so far not been discussed in any detail. It is to be recommended in particular with regard to the aimed-for immunity to interfering factors to construct the sensor element with a ferrite core and a sensor coil disposed in the ferrite core, the ferrite core being formed such that is open for the passing through of magnetic fields on the side which in the installed state is facing the signaling face. Apart from the shielding of the sensor coil, the measuring effect is also maximized.

The ferrite core may in this case be formed as an open pot core, as an E core or as a U core.

Preferably used for the conversion of the deformation occurring when the force transducer is subjected to loading, and the associated change in inductance, into a measuring signal suitable for further evaluation is either a bridge measuring method or else, preferably, an oscillator circuit, which is preferably disposed alongside the sensor element and is encapsulated together with the sensor element in the recess. The sensor element preferably represents a frequency-determining part of the oscillator circuit.

Of the sensor effects occurring in the form of changes of the complex permeability, preferably only the real part is evaluated, since, by contrast with the imaginary part, this is immune to interference. This is of special significance with regard to the electromagnetic interference signals of up to 200 V/m occurring in the interior of a vehicle.

In the case of this method, the change in inductance when there is alternating loading of the load cell produces changes in the frequency of the oscillator. This allows a signal which is analogous to the frequency to be generated, with which the further signal transmission can be performed with levels which are very immune to interference (for example TTL). This method also permits very simple further signal processing, since only counters which can be easily read out by commonly used microcontrollers are necessary for the representation of a measured value. Such counters may already be provided in the recess of the force transducer as part of the circuit, preferably integrated into a so-called ASIC chip.

To achieve easily reproducible qualities of the signaling face, it is preferably formed by a composite ferrite-polymer sheet, which is disposed in the measuring portion of the force transducer opposite the sensor element. In the case in which the force transducer is produced from an aluminum alloy, in this case a certain signal gain is also obtained, whereas the advantage of the composite ferrite sheet in the case of force transducers made of steel lies rather in the fact that compensation is provided for the differences frequently observed with this material in the magnetic behavior.

What is more, with the composite ferrite-polymer sheet, the properties of ferrites (high measuring signal) are combined with the easy handling (deformability, adaptability) of plastic sheets.

In order to protect the force transducer from mechanical overloading, the non-deforming part of the force transducer may be formed as a mechanical stop for deformation of the deformable part of the force transducer. If the permissible limit loading of the force transducer is exceeded, the elastically deformable part comes up against the non-deforming part and is supported there. Consequently, excessive loading is avoided, and consequently so too is excessive deforming of the force-introducing part. This measure can be performed in twofold manner, that is to say with regard to expected tensile forces and compressive forces.

In the case of a particularly preferred embodiment, finally, not only the sensor element, and possibly parts of the circuit, but also the sensor arrangement are disposed all together in the recess. If the entire sensor arrangement is encapsulated in a separate housing, it can be exchanged in an extremely simple way, comparable to a spark plug.

On account of the configuration of the load cells according to the invention, they can be disposed between the seat frame and the supporting frame of a vehicle seat, it being possible to obtain a weight signal which is independent of the position in which the vehicle seat happens to be at the time, seen in the longitudinal direction of the vehicle, and also to allow further adjusting possibilities of the seat, for example height adjustment, setting the inclination of the backrest, pivoting the sitting area about an axis transverse to the longitudinal direction of the vehicle etc., without the measuring signal being falsified to an inadmissible extent as a result.

When the load cells according to the invention are used for weight determination in a vehicle seat, either the seat frame may be connected to the non-deforming part of the force transducer and the supporting frame connected to the elastically deformable part, or else vice versa, the seat frame connected to the elastically deforming part of the force transducer and the supporting frame connected to the non-deforming part of the force transducer, so that the force transducer preferably creates a direct connection between the seat frame and the supporting frame.

In order to realize a relatively high degree of accuracy for the weight measurement and the center-of-gravity determination, the seat frame is preferably connected to the supporting frame via four load cells.

The use of at least three load cells in connection with the present invention additionally has the advantage that the force transducers can then be disposed in such a way that the so-called H point of the seat position in the vehicle is not increased, or at most is increased insignificantly.

The mounting possibility proposed above as being preferred, that is to say mounting the seat frame on the one hand and the supporting frame on the other hand directly on the non-deforming part of the force transducer and on the elastically deforming part of the force transducer respectively, often even brings the advantage that the H point can be placed slightly lower.

The H point is of interest because it constitutes part of a vehicle registration and is an indirect measure of the headroom of the vehicle. Changing the H point beyond an amount which is fixed—according to the vehicle type—inevitably means that a change which necessitates renewed registration of the entire vehicle is made.

The device according to the invention preferably has one or more temperature sensors, the measuring signals of which are received by the evaluation circuit and used for the temperature correction of the weighing signals in the creation of the output signal.

For reliable functional monitoring, preferably two temperature sensors operating independently of each other are used in each load cell.

Specifically in motor vehicles which are often parked outdoors, the ambient temperature of the load cells changes within great ranges and rapidly, for example if the vehicle is started in winter temperatures below freezing and the passenger compartment is heated up to 20° C. and more in a few minutes by the vehicle heating, or if in summer the vehicle is exposed to direct solar radiation and temperatures far above 60° C. are reached in the interior and, after the vehicle is started, the air in the passenger compartment is lowered to 20° C. in an extremely short time by ventilation and/or switching on of the air-conditioning system.

In specific applications, a greater degree of accuracy of the correction of the force bypasses can be achieved by disposing in the footwell of the vehicle (associated with each individual vehicle seat) a sensor which generates a force-bypass weighing signal which corresponds to the leg placement forces at this area, is supplied to the evaluation circuit and is received and evaluated by the latter.

The evaluation circuit will preferably comprise a function for forming a sliding mean value, with the aid of which weight fluctuations which are produced by ambient influences in the vehicle, such as the acceleration or deceleration of the vehicle, or else loading peaks which are caused by shocks induced by unevennesses of the road, vibrations and the like, are eliminated and a weighing result which is largely freed of ambient influences can be achieved.

The sliding mean-value formation has the advantage that a long-term mean value is constantly available, and consequently a weighing signal which is largely free of ambient influences can be made available at any time as an output signal.

In the case of preferred embodiments of the device according to the invention, the evaluation circuit will comprise a functional unit for the calculation of acceleration values of the vehicle, which exclusively evaluates changes over time of the weighing signals of the load cells. This makes it possible to save the need for separate acceleration sensors, the evaluation electronics otherwise to be associated with the latter and, in particular, also to save the need for the associated cabling.

Furthermore, the evaluation circuit may comprise a differentiating function, which differentiates on the basis of changes over time of the weighing signals of the load cells between weights which are exerted on the vehicle seat by actual persons on the one hand and inanimate objects on the other hand, and supplies a corresponding output signal. This allows even heavy objects placed on the vehicle seat to be detected and triggering of the airbags to be suppressed.

In a series of vehicles, vehicle data are made available via a bus system, via which all the control devices located in the vehicle exchange information. The device according to the invention therefore preferably has an interface for the reception of such vehicle data, so that it can also be used by the evaluation circuit when processing the measurement data.

For safety reasons, it is recommendable to check the load cells for their function at regular time intervals and/or when specific events occur, such as for example the unlocking of the motor vehicle or the starting of the engine.

Accordingly, the evaluation circuit will preferably comprise a diagnostic function, by means of which the functional capability of the load cells can be checked.

The evaluation circuit will preferably comprise a data memory in which weighing signals, output signals and/or other measuring signals received by the evaluation circuit or output signals generated by the latter can be stored for a predetermined period of time. This data memory has not only a so-called tachograph function, but may also be available to the evaluation circuit itself, in order to allow plausibility checks of currently obtained weighing signals etc. to be carried out. In addition, an assessment of the operating state of the force transducers can be carried out on the basis of these data, which satisfies a further safety aspect.

In the case of a preferred form of the evaluation circuit, the load range of each and every transducer is subdivided into load range intervals and how many loads have so far occurred in each of the intervals is summated over a time period. This then allows a frequency distribution of the loads to be calculated, and overload situations can be registered in this way.

The results of such checks are preferably then stored in a further portion of the data memory.

The long-term drift of the zero signal is a constant function, i.e. a function in which the individual values do not change abruptly. On account of this fact, the evaluation circuit is capable, by analysis of the variation over time of the zero signals, of differentiating such a drift from abrupt changes, such as are induced by objects placed on the seat, and consequently of correcting the zero drift and also the associated measuring errors.

Suitable points in time for detecting the zero signals with subsequent storage for observation of the long-term drift are, for instance, the moment when the vehicle is unlocked or locked. If an object is left behind on the seat, this takes the form of an abrupt change with respect to the previously noted state and is blanked out from the observation of the long-term drift by means of the discriminator.

The recording of the data over a predetermined time period, in particular the data which are supplied by the individual load cells, allow them to be represented and stored as a frequency distribution and, as a result, allow an assessment of all the loading situations that have occurred in the past, so that the evaluation circuit assumes a so-called logbook function. For the calculation of the frequency distribution, as already described above, the load range is divided up into intervals and, in addition, an overloading range is defined, and the evaluation circuit summates how often loading values have occurred in the respective intervals or how often overloading situations have occurred.

This type of evaluation requires only little memory space and allows analysis of the data over very long time periods. This is of great significance in particular for checking the full functional capability of the force transducers and the evaluation circuit.

The detection of the individual measured values of the force transducers and the comparison of these values with data obtained earlier allows a plausibility appraisal, and consequently makes it possible for the evaluation circuit to detect functional errors of the entire device. If a malfunction is detected in this check, a corresponding error code is passed on to a downstream control device, for example the electronics of the vehicle and their central computer.

The invention also relates to a method for evaluating weighing signals which are obtained with the aid of the device described above.

This method for detecting and preprocessing weights acting on a vehicle seat for determining the mass of an occupant sitting on a sitting area of the vehicle seat comprises the steps of:

detecting by means of an electronic evaluation circuit weighing signals of at least three load cells disposed on load-carrying parts of the vehicle seat at corner points of an imaginary polygonal area;

forming from the weighing signals an absolute overall weighing signal, which corresponds to the weight exerted on the seat by the mass of the occupant;

determining from the weighing signals the position of the center of gravity of the weight exerted on the sitting area by the mass of the occupant;

correlating the absolute overall weighing signal with the position of the center of gravity, with a correction parameter being determined;

calling up a mass correction value for the correction of force bypasses in dependence on the correction parameter from a data memory which contains stored mass correction values for absolute overall weighing signals and center-of-gravity positions correlating to them; and calculating the mass of the occupant from the absolute overall weighing signal and the mass correction value.

The method according to the invention comprises a step by which, on the basis of weighing signals of the load cells with the vehicle seat unloaded, a correction of the zero point of the weighing signals is performed.

The zero-point correction is of considerable significance in the case of the device according to the invention and the method according to the invention, since the measuring system which comprises the force transducers generally remains in the vehicle together with the vehicle seat for years, and experience shows that distinct shifts in the zero point of the individual sensor elements or load cells occur over this time period.

The correction of the zero drift is performed according to the invention by storing for each load cell a last-valid weighing signal $W_L$ with the vehicle seat unloaded and comparing this with the weighing signal $W_N$ of the subsequently valid measurement with the seat unloaded, by a difference $$D=W_N-W_L$$

being formed, and it then being checked whether this lies within a predetermined range of zero drift values, by this difference being added to a value stored in a difference-value memory in the case in which the difference D lies within the predetermined range, and by this difference being discarded and the value stored in the difference-value memory kept constant in the case in which the difference D lies outside the predetermined range.

The measuring system differentiates in a simple way between small loads and a zero drift, even if the small load is sustained for a long time, such as in the case of a seat covering pulled over the seat. Here, an abrupt increase in the zero-point weighing signal is established in the first check of the change in the zero point, this change is discarded and the zero-point value with the seat covering pulled on is used as $W_L$ in the next measurement, so that, from this point in time, the zero drift can continue to be checked and monitored, even if on a parallel-shifted level.

The case of a newspaper or briefcase left behind on the seat consequently also cannot lead to an error correction, even if it remains there for a long time and is only removed again later. In this case, as long as the object remains on the seat and there is no further loading of the seat, the zero-point correction is carried out. If the object is then removed later, the system then observes an abrupt decrease in the zero-point signal, with the difference D then being discarded again but the weighing signal itself continuing to be used as $W_L$ and checking continuing again on the original level.

The data stored in the memory for the mass correction are preferably determined empirically for a specific type of vehicle seat. In this way, the most accurate correction values are obtained.

The weighing signals of the individual load cells are generally subjected to a mean-value formation before the preprocessing by the electronic evaluation circuit, in order in this way to eliminate higher-frequency interference signals, which are brought about for example by vibrations of the vehicle or by shocks caused by poor road conditions. Summation over a time period of, for example, 1 s is already adequate in this connection. As a result, however, even the most frequently encountered interference signals are blanked out, without the system becoming slow to react as a result.

The load cells are preferably disposed in such a way that they convert vertically acting forces into a deformation in a vertical plane, so that horizontally acting interfering forces, such as for example accelerating or decelerating forces, which are low-frequency, are at most subordinate and often negligible for the results aimed for according to the invention. This avoids a compulsion to take these interfering forces into account, in particular in the decision whether an occupant assumes a position in which the airbag can be fired safely.

Since one of the factors on which this depends is the momentary sitting position of the occupant, it is essential in this connection not to be dependent on a slow-responding system, since the occupant can change his sitting position momentarily.

The method according to the invention consequently not only provides an accurate mass value of the respective occupant, in which not only the measured mass value but also the proportion of the mass which is supported on the vehicle floor, and cannot be measured via the seat due to force bypasses, is taken into account by means of the mass correction value, but also provides a system in which interfering signals are blanked out, without the system becoming slow to respond as a result.

The detection of the weighing signals when the vehicle seat is unloaded is preferably performed at predetermined time intervals and/or when predetermined events generally allowing the assumption of an unloaded seat occur.

This is the case for example when the vehicle is unlocked or locked. An appropriate time interval for carrying out the zero-point correction is, for example, one or more days. With these time intervals, the zero drift remains small and can be clearly differentiated from small loads.

In the case of a further preferred method, it is provided that it comprises a diagnozing mode, in which the functional capability of the load cells is checked at predetermined time intervals and/or when predetermined events occur, for example filling the tank of the vehicle.

In the diagnozing mode, preferably the occurrence of a difference D is detected in the case of a weighing signal outside the predetermined range and an alarm signal is generated in the case in which this applies only to the weighing signal of one of the load cells. Such an occurrence can be clearly associated with a malfunction of the load cell generating the weighing signal, since the load cells are sensitive and sufficiently accurate to detect any small loading, even if it occurs off-center.

In the case of a preferred device, four load cells are used, disposed at the corners of a rectangle. If one of the load cells fails, the evaluation circuit can still continue its function in an emergency operating mode, albeit with reduced accuracy. Safety considerations demand nevertheless that, in such a case, the evaluation circuit generates an alarm signal which indicates the fact that a load cell has failed.

In order to make the repair measure or the exchange involve as little effort as possible, it is preferably provided that, apart from the alarm signal, the evaluation circuit with a diagnostic function generates a further signal, which indicates which is the load cell detected as different.

In the case of a further preferred method, in a long-term recording mode the evaluation circuit will record for a predetermined sliding time period in an area of the data memory weighing signals, output signals and/or other signals received and/or generated. This memory operates on the FIFO principle, so that, depending on the extent of the memory area provided, a kind of logbook comprising the events of the last time period can be kept.

For the diagnosis and the functional monitoring of the load cells it is of significance to know the number of load changes and, in particular, the number of overload events, since this can be used as a basis for predicting a probable failure of the load cell and promptly warning that it should be exchanged.

For this purpose, the method according to the invention is preferably provided with a statistical function, by means of which the weighing signals of the individual load cells are classified into regular measuring events and irregular measuring events, representing cases of overload, and these are counted, an indicating signal being generated when a predetermined number of overload events is reached.

In order to realize further functional monitoring, the statistical function is extended by classifying the regular measuring events into a number of classes, the measuring events associated with each of the weight classes being counted for these classes.

In the long-term recording mode, for recording the respective signals, time signals correlating to them are preferably recorded in a data memory, so that a detailed analysis of the data can also be performed in their time correlation.

In the case of preferred methods according to the invention, vehicle data determined in the vehicle are received by a bus system via an interface. Typically, these vehicle data comprise the momentary vehicle speed, the actuation of the ignition lock, the unlocking and locking of the vehicle and also time and calendar-date information.

Of the vehicle data, preferably the vehicle speed data are evaluated and used to determine acceleration values, which are optionally compared with the acceleration values calculated from the changes over time of the weighing signals of the load cells.

Conclusions as to the gradient of the road and its influence on the measuring signals of the load cells can be drawn from the comparison.

Long-term appraisals can be used to draw conclusions as to the functional capability of the load cells.

The transmission of the information concerning the unlocking and/or locking of the vehicle allows a starting signal to be derived for carrying out the zero-point correction.

In the case of preferred methods according to the invention, from the vehicle data the calendar date is evaluated and used, so that, for example when carrying out a zero-point correction, the correction performed is stored as an event with an associated calendar date, and the respectively currently received calendar date is compared with the calendar date of the last-performed zero-point correction. It can easily be detected from this when a vehicle has been at a standstill or not been used for quite a long time. The zero-point shift detected at the later point in time can be checked for ascertaining whether it is a zero drift, which is to be corrected, or whether the zero-point shift is associated with a fixed change in the preloading of the vehicle seat.

BRIEF DESCRIPTION OF THE DRAWINGS

These and further advantages of the invention are specifically explained in still more detail below on the basis of the drawings, in which specifically.

DETAILED DESCRIPTION OF INVENTION EMBODIMENTS

Figure 1:
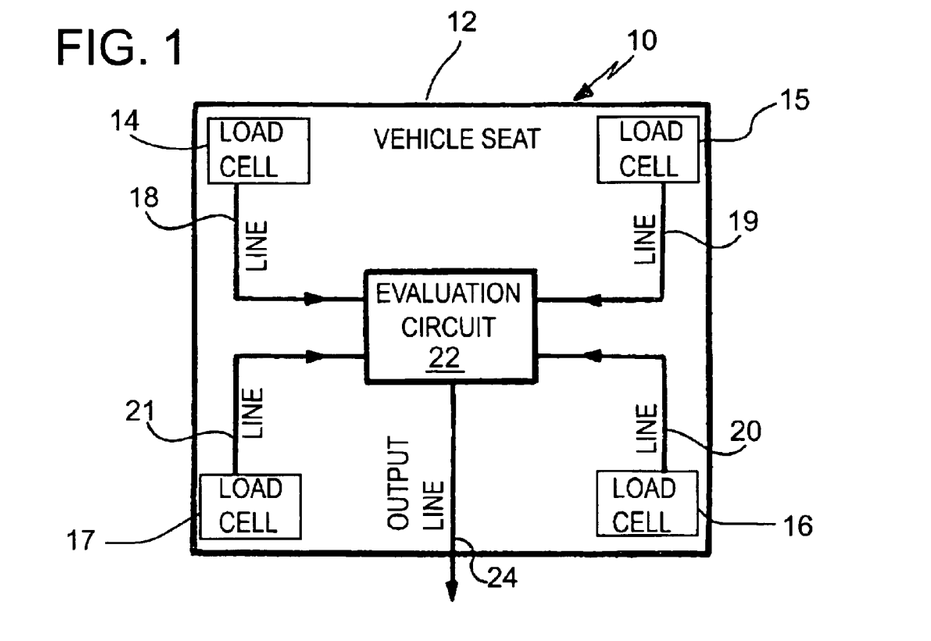
FIG. 1: shows a weight detecting and evaluating device according to the invention.

FIG. 1 schematically shows a device 10 according to the invention for detecting and evaluating a weight which acts on a vehicle seat 12 (only indicated here).

In the present example, the device 10 according to the invention comprises four loads cells 14, 15, 16 and 17, which are disposed in the region of the four corners of the sitting area of the vehicle seat 12.

The loads cells 14 to 17 are connected via signal lines 18, 19, 20 and 21 to an evaluation circuit 22, which receives and preprocesses the weighing signals supplied by the load cells. Once preprocessing has taken place, which will be described still further below, the evaluation circuit provides via a signal output line 24 an output signal for a downstream control circuit or the electronics of the vehicle, which assume(s) the further routing of the signal to the airbag control electronics, possibly in an additionally preprocessed form.

The signal output line 24 may be part of the vehicle's own signal bus system, via which vehicle data are exchanged between various control units of the vehicle.

Figure 2A:
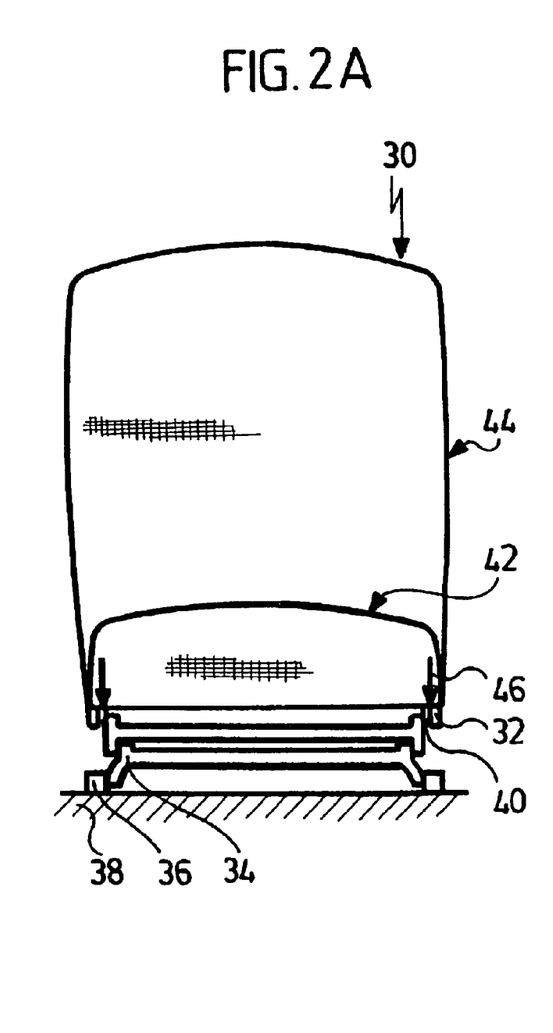
FIGS. 2A/B: show a vehicle seat in front view and side view with a device according to the invention.
Figure 2B:
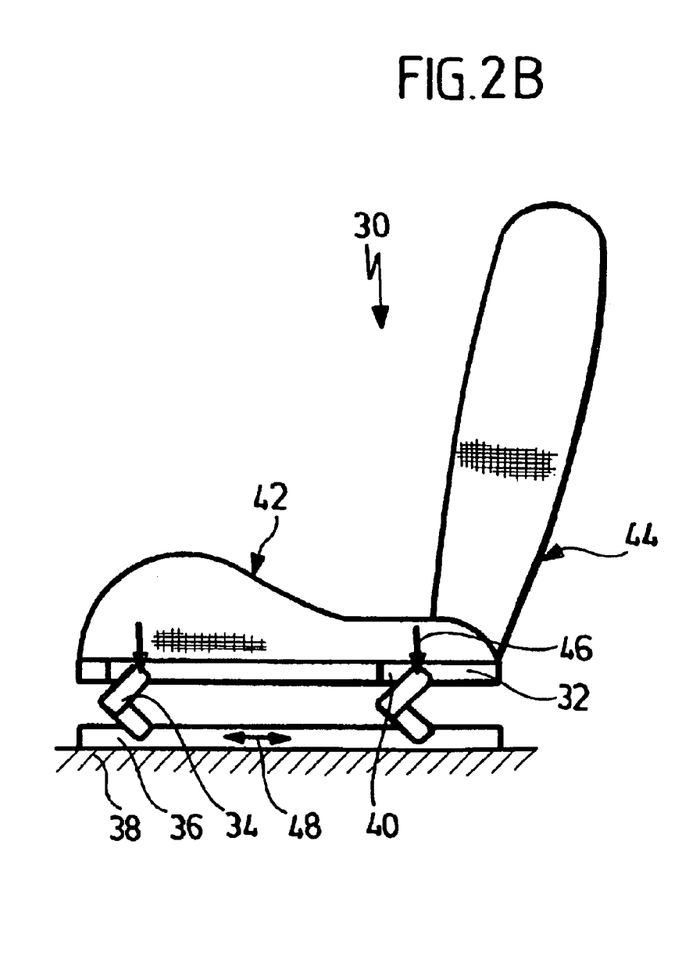

FIGS. 2A and 2B show in greater detail a vehicle seat 30 in a front view and side view, respectively, with a seat frame 32 and a supporting frame 34. The supporting frame 34 is secured displaceably in the longitudinal direction of the vehicle on rails 36 on a vehicle floor 38. In the present example, the supporting frame 34 is adjustable in height and holds the seat frame 32 at four points. The connection between the supporting frame 34 and the seat frame 32 takes place by means of load cells with a force transducer, the force transducer having a non-deforming part and an elastically deformable part. One of the two parts is mounted on the seat frame 32, the other, respectively, is mounted on the supporting frame 34. Held on the seat frame 32 is a sitting area 42 and also a backrest 44. If a weight then acts on the vehicle seat 30 in the sense of the arrows 46, the weighing signal generated by the load cells 40 remains independent of the height setting of the sitting area 42.

By the load cells 40 being disposed between the supporting frame and the seat frame, upward shifting of the so-called H point is avoided. In many designs of seat it is even possible to gain a certain height for the H point, i.e. the latter can be placed lower than in the original seat design. This avoids the necessity for renewed registration of a vehicle or even only the amendment of a registration of a vehicle.

Even a displacement of the vehicle seat 30 in the sense of the double-headed arrow 48 (FIG. 2B) has no influence on the weighing signals determined by the load cells 40.

If the sitting area 42 is tilted forward, i.e. the height adjustment of the supporting frame 34 is performed less at the front than in the rear region, or vice versa, the center of gravity of the person sitting on the seat 30 is automatically shifted as a result. On account of four loads cells being disposed on the seat 30, this shifting of the weight can be registered as shifting of the center of gravity, and, on the basis of this, possibly changed force bypasses can be taken into account in the evaluation.

No further details have been given so far concerning the forming of the load cells, which according to the invention are disposed between the seat frame and the supporting frame of the vehicle seat.

Figure 3:
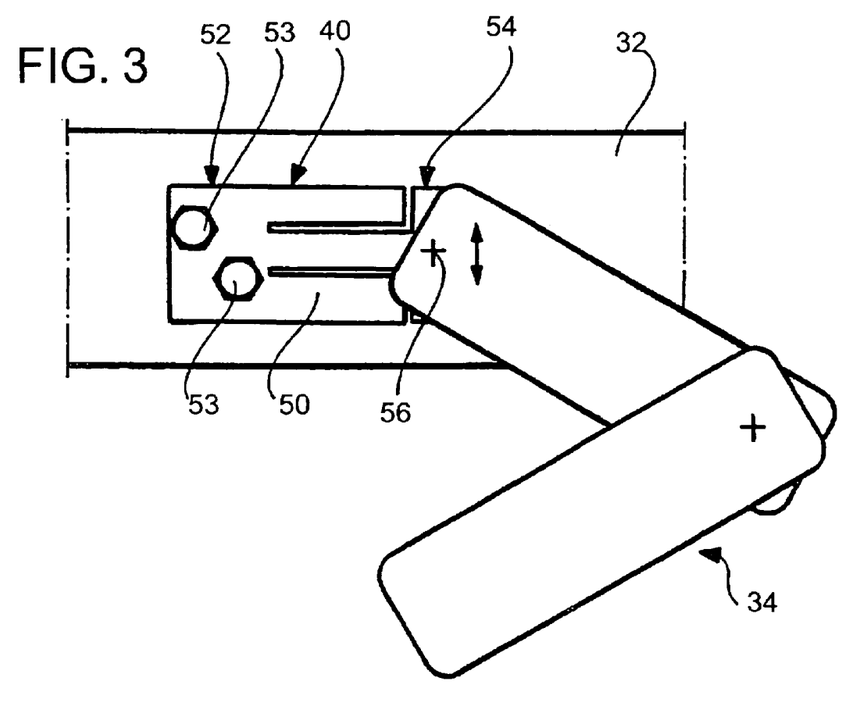
FIG. 3: shows a schematic view of a detail of the vehicle seat of FIG. 2B.

On account of the interfering influences which are often to be encountered in motor vehicles, so-called inductive force transducers are suitable in particular as a component part of the load cells. An example of such a force transducer is schematically represented in FIG. 3, which at the same time also serves for further illustration of the preferred mounting of the load cell between the seat frame and the supporting frame. The setup shown in FIG. 3 corresponds in principle to the setup of FIGS. 2A/B.

The load cell 40 in this case comprises a force transducer 50, which operates inductively. The force transducer 50 comprises a non-deforming part 52 and an elastically deformable part 54. In the present exemplary embodiment, the non-deforming part 52 is secured to the seat frame 32 by means of screw bolts, while the elastically deformable part 54 is connected in the region of the pivot point of an adjusting mechanism of the supporting frame 34. As can be easily illustrated by FIG. 3, the mounting principle between the seat-frame force transducer 50 and the supporting frame 34 can also be realized conversely, the non-deforming part 52 of the force transducer 50 then being secured at the pivot point 56 of the supporting frame or its height-adjusting mechanism and the elastically deforming part 54 being connected directly to the seat frame 32.

Figure 4:
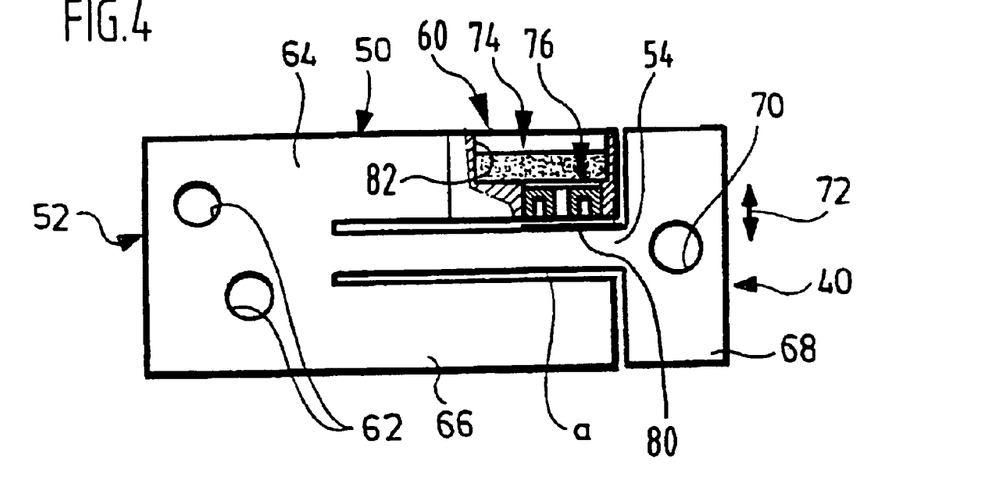
FIG. 4: shows a partly broken-open side view of a load cell of a device according to the invention.

FIG. 4 shows the load cell of FIG. 3, provided overall with the reference numeral 40, with a force transducer 50 and an inductively operating sensor arrangement 60.

The force transducer 50 comprises a portion 52 which can be fixedly mounted and has two bores 62, with which the fixed mounting of the force transducer 50 can take place by means of screw bolts 53 (not represented here).

From the fixedly mountable portion 52 of the force transducer 50 there extend two substantially parallel projections 64, 66 with a defined spacing a from each other. These projections 64, 66 are formed as non-deforming parts of the force transducer 50.

Between the two parallel projections 64, 66 there extends from the fixed portion 52 an elastically deformable part 54 (also known as a bending bar), which has at its free end a mounting portion 68 with a bore 70. Altogether, the elastically deformable part 54 and the mounting portion 68 are referred to hereafter as the force introduction part.

In the load-free state, the non-deforming projections 64, 66 and the elastically deformable part 54 extend with a constant spacing a in relation to each other.

If a force acts on the force introduction part, the mounting portion 68 moves downward or upward in the sense of the double-headed arrow 72, according to the direction of force introduction. As a result, the gap existing between the elastically deformable part 54 and the non-deforming part 64 or 66, i.e. the spacing a of the elastically deformable part 54 in relation to the non-deforming parts 64, 66, is increased or reduced.

This changing of the spacing is detected by a sensor arrangement 60 disposed in a measuring portion and supplies a weighing signal corresponding to the force acting.

The sensor arrangement 60 has for this purpose an inductively operating sensor element with a ferrite pot core 76 and a coil disposed in the pot core. On account of the deformation of the elastically deformable part 54 under the effect of force on the mounting portion 68, the spacing of the sensor 74 in relation to the surface lying opposite (=signaling face) of the elastically deformable part 54 increases or decreases, whereby an electric signal is induced in the coil.

This signal can be amplified by disposing a composite ferrite sheet 80 on the signaling face of the elastically deformable part 54.

The sensor arrangement 60 itself is disposed in a recess 82 of the non-deforming part (projection 64) of the force transducer 50 and is consequently already protected against mechanical damage. At the same time, the metallic surrounding acts as protection against electromagnetic interference fields.

Preferably, as represented in FIG. 4, a further part of the sensor arrangement, that is to say an oscillator, is disposed in the recess 82. The entire sensor electronics of the sensor arrangement may possibly also be disposed in the recess 82, so that all that remains is for the load cell 40 to be provided with an electrical line (not represented), in order to connect it to an evaluation circuit (not represented) for the weighing signal.

Once the sensor 74 and the sensor electronics (in particular oscillator) are disposed in the recess 82, the space still remaining above can be cast with a curable composition, so that the sensor 74 and the sensor electronics are protected and encapsulated not only against mechanical influences but also against the influences of temperature and moisture.

Figure 5:
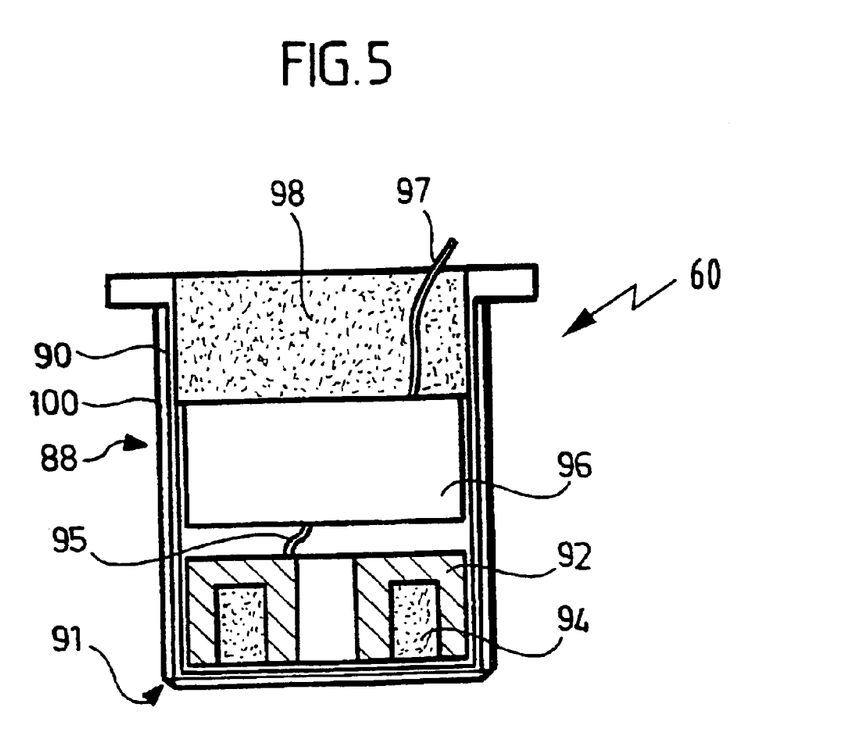
FIG. 5: shows a sectional view through a sensor element of a load cell of a device according to the invention.

FIG. 5 shows in side view a sensor element 88, which is encapsulated in a separate housing 90. This reveals the arrangement of an annular pot core 92, which receives a coil 94 in a recess which is open on one side. The underside of the pot core 92 faces toward the open free end of the housing 90. The housing 90 is hermetically sealed at its end 91 with respect to ambient influences, but is permeable to magnetic fields.

The coil 94 is connected via an electrical line 95 to sensor electronics 96 comprising an oscillator, which altogether provide on the output side, via a cable 97, the actual weighing signal of the sensor or of the force transducer. At its second end, the housing 90 is closed by a casting composition 98 and is consequently encapsulated against ambient influences. On its outer side, the housing 90 has a screw thread 100, and can consequently be screwed into a bore of a force transducer.

It is clear from the description above that the vehicle seat according to the invention is suitable not only for motor vehicles or automobiles, but also for example as a seat in aircraft, the possibility of performing a very exact estimate of the total mass of the passengers being transported then being provided there. This has advantages in the estimation of the reserves of fuel to be carried or, evaluated differently, in the calculation of an additionally possible cargo load.

The signal cable 97 is connected via the plug-in connection (not shown) to evaluation electronics (cf. FIG. 1), which preprocesses the weighing signal of the sensor 88 or of the force transducer, possibly with further weighing signals of further load cells mounted on the vehicle seat, and provides the vehicle electronics with a signal which is, for example, a signal differentiating different weight classes and consequently can be used directly for the activation of multiple airbags capable of being fired.

Figure 6:
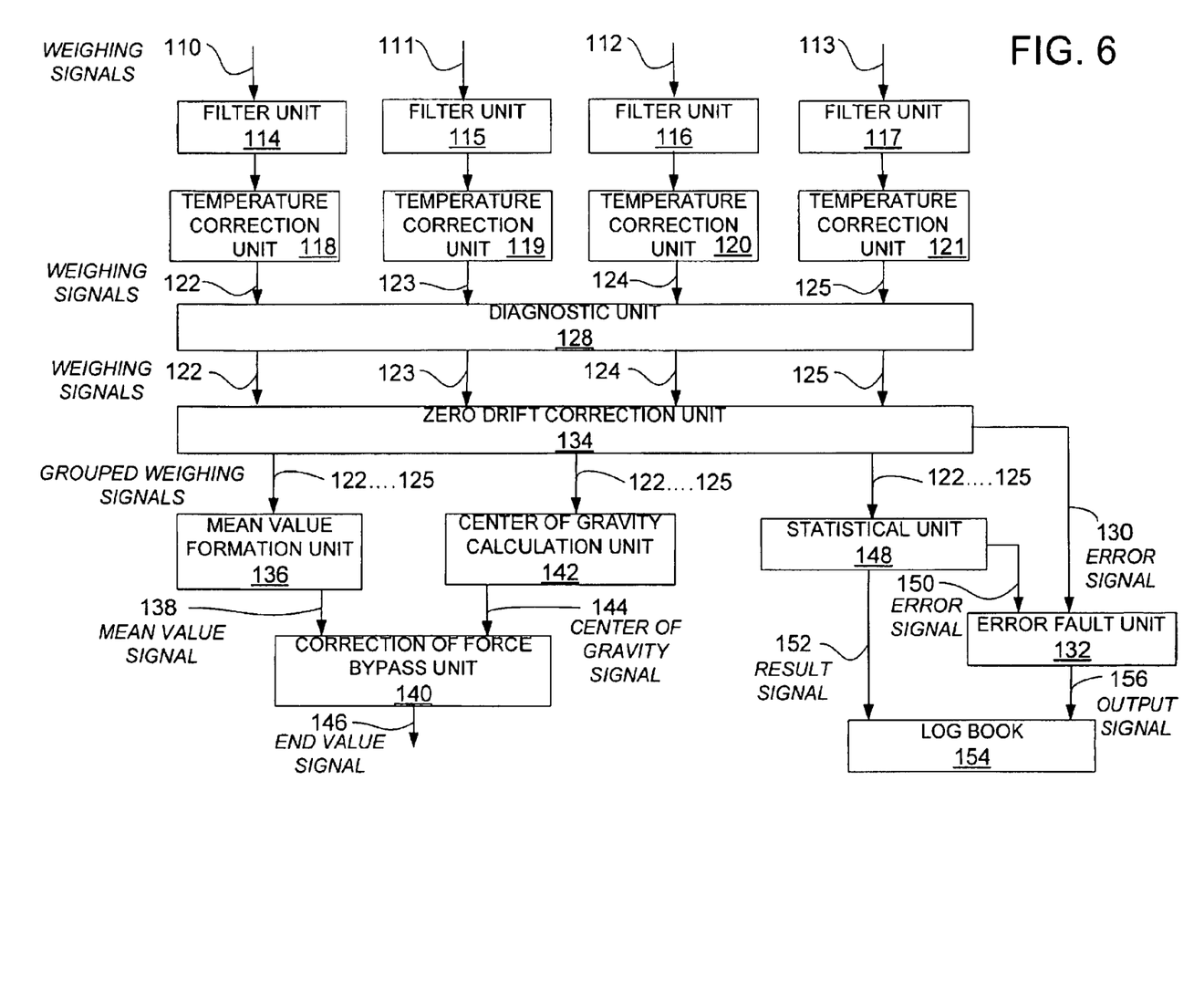
FIG. 6: shows a schematic representation of the weight detecting and evaluating method according to the invention.

FIG. 6 comprises a schematic representation of the weight detecting and evaluating method according to the invention, which at the same time illustrates an internal structure of a preferred device for carrying out this method. This representation is based on the assumption that the device has four sensors, which send weighing signals 110, 111, 112 and 113 to the electronic evaluation circuit. In an input state of the device, these raw signals are in the first instance filtered in a first step in filter units 114, 115, 116 and 117, in order to eliminate high-frequency interference signals, as are induced for example by driving over uneven roads (in particular potholes) and also vibrations of the vehicle.

In a following step, the temperatures prevailing locally are established by temperature sensors associated with the respective load cells and, in a further step, are corrected for the temperature error in the correction functions 118 to 121.

The weighing signals 122 to 125 corrected in this way are then transferred to a diagnostic unit 128, in which plausibility checks are carried out in a first step, on the basis of which the correct function of the individual load cells is checked. If in this check a weighing signal which corresponds, for example, to a mass of 1 kg is found, for example, in the case of one load cell, whereas the other load cells indicate a weighing signal with the value corresponding to the mass 0 kg, this indicates the failure of this one load cell. In this step, an error signal 130 is then generated by the diagnostic unit 128 and is passed on to a unit 132 for the handling of error messages. In the event that the plausibility check is correctly carried out by the diagnostic unit 128, the temperature-corrected weighing signals 122 to 125 are passed on to a correction unit 134 for zero-drift correction. In this function, it is checked in the first instance whether the weighing signals are weighing signals of an unloaded vehicle seat and, if this is the case, a comparison with the last-stored zero-value signal $W_L$ is then performed and, in the case that a difference D is found, this is passed on to a zero-drift memory for summation. The current zero-value signal $W_N$ is then stored as a new weighing signal $W_L$, so that continuous monitoring of the zero drift of the weighing signals can be carried out just by the use of two memory locations per load cell, that is to say the memory location for the last-measured zero value $W_L$ of the weighing signal and the zero-drift addition memory.

After the zero-drift correction in the correction unit 134, the weighing signals are passed on individually to various functions, which are to be briefly described below.

One of the functions to which the signals 122 to 125 are sent is the function for mean-value formation 136, which here concerns a function for forming a sliding mean value. This means that newly fed-in weighing signals replace the oldest weighing signals so far taken into account in the mean-value formation, so that the mean value is constantly updated in a sliding manner. The signal 138 emitted by the mean-value function combines the values of the weighing signals 122 to 124 and passes on a overall weighing signal to a unit for the correction of force bypasses.

Similarly, the weighing signals 122 to 125 are passed on to a function 142 for the calculation of the position of the center of gravity of the occupant on the sitting area. The determined position of the center of gravity is passed on as a signal 144 to the unit for the correction of the force bypass 140. The unit for the calculation of the force bypass then forms from the overall weighing signal 138 and the force-bypass correction performed here an end value 146, which substantially corresponds to the body mass of the occupant. This end value is ultimately used for assessing the physical robustness of the occupant or else the size of the latter, in order to influence the control of the airbag.

The determination of the position of the center of gravity is additionally used (not represented here) (signal 144) to detect situations where the occupant is at risk when the airbag is fired and to disable the airbag control in such hazardous situations. This is the case for example whenever the center of gravity is shifted forward extremely, so that it is to be assumed that the occupant is very close to the place where the airbag is mounted, a situation in which firing of the airbag can have fatal consequences.

Finally, the grouped weighing signals 122 to 125 are passed to a statistical unit 148, in which the weighing signals are classified according to various weight classes and also an overload, and in which an enumeration of the measuring events is carried out, in order to obtain a frequency distribution. This frequency distribution allows an assessment of the reliability of the load cells or of their force transducers, which is based on knowledge of the so-called Wöhler curves for the material of the force transducers.

The statistical unit 148 assumes what amounts to a second diagnostic function and ultimately monitors the number of load changes in the case of the force transducer of the load cell in dependence on the forces occurring during the load changes, in order to be able to generate promptly a signal 150 which indicates that the force transducer of a load cell respectively concerned has reached the end of its useful life on the basis of the accumulated measurement results, for example from irregular measurement results which correspond to an overload situation.

The regular results of this statistical function can be passed on via the signal line 152 to a so-called logbook function 154, in which these events are stored and are kept ready for reading out for the electronics of the vehicle, for example when maintenance work is carried out on the vehicle.

In the same way, the unit 132, which is responsible for handling fault or error signals 130 and 150, will generate output signals, which pass directly (not represented) to the electronics of the vehicle, where they draw the attention of the operator of the vehicle to the fact that a malfunction has occurred and/or the end of the useful life of a load cell.

The message which is emitted to the electronics of the motor vehicle is output parallel to this as a signal 156 and recorded in the logbook 154. It is particularly preferred to link the entry of the respective date in the logbook with a time signal (for example time of day and/or calendar date, as made available by the vehicle's own bus system), so that the time sequence of the occurrence of various situations can be clearly traced back from the logbook 154.

What is claimed is:

1. A device for detecting and evaluating weight exerted by a person sitting on a vehicle seat, the device comprising
    at least three load cells, said load cells being non-linearly disposed and spaced apart and disposed on said load-carrying parts of the vehicle seat, said load cells each generating a weighing signal corresponding to the weight; and
    an electronic evaluation circuit, adapted to receive and preprocess the weighing signals of the load cells and generate an output signal based on the weighing signals, the evaluation circuit comprising an evaluation function with which a localization of the center of gravity of the weight acting on the vehicle seat can be carried out from the individual weighing signals of the at least three load cells, and
    the evaluation circuit comprising a correction function, with which force bypasses can be taken into account in the forming of the output signal,
    the evaluation circuit comprising a function for automatic zero-drift correction of the weighing signal,
    the function for the automatic drift correction comprising a discriminator for differentiating drift in the weighing-signal from low loads of a limited time; and
    the evaluation circuit comprising a function for a long term recording mode, wherein the evaluation circuit includes a data memory for storing over a predetermined sliding time period weighing signals, output signals and/or other signals and, in addition, records in an associated memory area of the data memory time signals correlating to the weighing signals, output signals and/or other signals.

2. The device according to claim 1, wherein the load cells are disposed such that the force introduction takes place vertically.

3. The device according to claim 1, wherein the load cells comprise an inductively operating force transducer.

4. The device according to claim 3, wherein the inductively operating force transducer is a force transducer operating on the eddy current principle.

5. The device according to claim 4, wherein the force transducer operating on the eddy current principle is operated in such that weighing signals corresponding to frequency values are generated.

6. The device according to claim 1, wherein the device comprises one or more temperature sensors generating measuring signals, the measuring signals being received by the evaluation circuit and used for temperature correction of the weighing signals in the generation of the output signal.

7. The device according to claim 6, wherein the device comprises a sensor which is to be disposed in a footwell of the vehicle, the sensor generating a force-bypass weighing signal which corresponds to leg placement forces and is received by the evaluation circuit.

8. The device according to claim 1, wherein the evaluation circuit comprises a function for forming a sliding mean value.

9. The device according to claim 8, wherein the function of the evaluation circuit for forming a sliding mean value comprises a filter function, said filter function operating to detect values of the weighing signals induced by acceleration, deceleration and/or vibrations of the vehicle and/or by movements of the person on the vehicle seat, and to discard or use said values of the weighing signals in a way corresponding to predetermined criteria.

10. The device according to claim 1, wherein the evaluation circuit comprises a functional unit for the calculation of acceleration values of the vehicle, said functional unit exclusively evaluating changes over time of the weighing signals of the load cells.

11. The device according to claim 10, wherein the evaluation circuit has an interface for receiving vehicle data available in the vehicle.

12. The device according to claim 1, wherein the evaluation circuit comprises a diagnostic function for checking the functional capability of the load cells.

13. A method for detecting and preprocessing weights acting on a vehicle seat for determining the mass of an occupant sitting on sitting area of the vehicle seat, comprising the steps of:

detecting by means of an electronic evaluation circuit weighing signals of at least three load cells disposed on non-linearly disposed, spaced, load-carrying parts of the vehicle seat;

forming an absolute overall weighing signal from the weighing signals, the absolute overall weighing signal corresponding to the weight exerted on the seat by the mass of the occupant;

determining the position of the center of gravity of the weight exerted on the sitting area by the mass of the occupant from the weighing signals;

correlating the absolute overall weighing signal with the position of the center of gravity, with a correction parameter being determined;

calling up a mass correction value for the correction of force bypasses in dependence on the correction parameter from a data memory which contains stored mass correction values for absolute overall weighing signals and center-of-gravity position correlating to them;

calculating the mass of the occupant from the absolute overall weighing signal and the mass correction value;

correcting the zero point of the weighing signals on the basis of weighing signals of the load cells with the vehicle seat unloaded;

the zero-point correction being performed by storing for each load cell a last-valid weighing signal $W_L$ with the vehicle seat unloaded and comparing this with the weighing signal $W_N$ of the subsequently valid measurement with the seat unloaded;

calculating a difference $D=W_N-W_L$ being formed and checking it whether it lies within a predetermined range of zero drift values;

adding this difference to a value stored in a difference-value memory in the case in which the difference D lies within the predetermined range;

or, in the case in which the difference D lies outside the predetermined range, the value stored in the difference-value memory is kept constant; and wherein in a long-term recording mode, the evaluation circuit records in an area of a data memory for a predetermined sliding time period weighing signals, output signals and/or other signals and, in addition, records in an associated area of the data memory time signals correlating to the weighing signals, output signals and/or other signals.

14. The method according to claim 13, wherein the method step of correction of the zero point is initiated at predetermined time intervals and/or when predetermined events occur.

15. The method according to claim 13, wherein the method comprises a diagnozing mode, in which the functional capability of the load cells is checked at predetermined time intervals and/or when predetermined events occur.

16. The method according to claim 15, wherein, in the diagnosing mode, the occurrence of a difference D is detected in the case of a weighing signal outside the predetermined range and an alarm signal is generated in the case in which this applies only to the weighing signal of one of the load cells.

17. The method according to claim 16, wherein a signal which identifies the load cell detected as different is generated apart from the alarm signal in the diagnosing mode.

18. The method according to claim 13, wherein, in a long-term recording mode, the evaluation circuit records for a predetermined sliding time period in an area of the data memory weighing signals, output signals and/or other signals received and/or generated.

19. The method according to claim 18, wherein the long-term recording mode comprises a statistical function, by means of which the weighing signals of the individual load cells are classified into regular measuring events and irregular measuring events, representing cases of overload, and these are counted, an indicating signal being generated when a predetermined number of overload events is reached.

20. The method according to claim 19, wherein the weighing signals corresponding to regular measuring events are subdivided into a number of weight classes and wherein for each of the weight classes the measuring events associated with them are counted.

21. The method according to claim 18, wherein, in the long-term recording mode, in addition to the recording of the respective signals, time signals correlating to the respective signals are recorded in a data memory.

22. The method according to claim 13, wherein acceleration values of the vehicle are calculated from changes over time of the weighing signals of the load cells.

23. The method according to claim 13, wherein vehicle data are received by an interface.

24. The method according to claim 23, wherein the received vehicle data comprise vehicle speed data and wherein the vehicle speed data are used to determine acceleration values, which are optionally compared with the acceleration values calculated from the changes over time of the weighing signals of the load cells.

25. The method according to claim 23, wherein the vehicle data contain data which indicate at least one of the unlocking and locking of the vehicle and wherein the reception of the locking and unlocking data starts the process of zero-point correction.

26. The method according to claim 23, wherein the vehicle data comprise the calendar date, wherein, when carrying out a zero-point correction, the correction performed is stored as an event with an associated calendar date and wherein the currently received calendar date is compared with the calendar date of the last-performed zero-point correction.

27. A method for detecting and preprocessing weights acting on a vehicle seat for determining the mass of an occupant sitting on a sitting area of the vehicle seat, comprising the steps of:

detecting by means of an electronic evaluation circuit weighing signals of a least three load cells disposed on load-carrying parts of the vehicle seat;

forming from the weighing signals an absolute overall weighing signal, which corresponds to the weight exerted on the seat by the mass of the occupant;

determining from the weighing signals the position of the center of gravity of the weight exerted on the sitting area by the mass of the occupant;

correlating the absolute overall weighing signal with the position of the center of gravity, with a correction parameter being determined;

calling up a mass correction value for the correction of force bypasses in dependence on the correction parameter from a data memory which contains stored mass correction values for absolute overall weighing signals and center-of-gravity position correlating to them;

calculating the mass of the occupant from the absolute overall weighing signal and the mass correction value;

correcting of the zero point of the weighing signals on the basis of weighing signals of the load cells with the vehicle seat unloaded;

the zero-point correction being performed by storing for each load cell a last-valid weighing signal $W_L$ with the vehicle seat unloaded and comparing this with the weighing signal $W_N$ of the subsequently valid measurement with the seat unloaded;

calculating a difference $D=W_N-W_L$ being formed and checking it whether it lies within a predetermined range of zero drift values;

adding this difference to a value stored in a difference-value memory in the case in which the difference D lies within the predetermined range;

or discarding this difference and storing a constant value in the difference-value memory in the case in which the difference D lies outside the predetermined range; and wherein, taking into account the summated values of the weighing signals, changes over time of the weighing signals of the load cells are used to differentiate whether a weight is exerted on the vehicle seat by a living person or an inanimate object, and wherein, depending on this differentiation, an output signal is generated.

28. Device for detecting and evaluating a weight exerted by a person sitting on a vehicle seat, comprising at least three load cells, which are disposed on load-carrying parts of the vehicle seat and in each case generate a weighing signal corresponding to the weight; and an electronic evaluation circuit, which receives and preprocesses the weighing signals of the load cells and generates an output signal based on the weighing signals, the evaluation circuit comprising an evaluation function with which a localization of the center of gravity of the weight acting on the vehicle seat can be carried out from the individual weighing signals of the at least three load cells, and the evaluation circuit comprising a correction function, with which force bypasses can be taken into account in the forming of the output signal, the evaluation circuit comprising a function for automatic zero-drift correction of the weighing signal, the function for the automatic drift correction comprising a discriminator for differentiating the weighing-signal drift from low loads of a limited time and a differentiating function, which differentiates on the basis of the changes over time of the weighing signals of the load cells between weights which are exerted on the vehicle seat by actual persons on the one hand an inanimate objects on the other hand, and supplies a corresponding output signal.

* * * * *